United States Patent [19]

Baker, Jr. et al.

[11] Patent Number: 4,569,682
[45] Date of Patent: Feb. 11, 1986

[54] PROCESS FOR REMOVING SOLIDS FROM A GAS CONTAINING THE SAME

[75] Inventors: Charles L. Baker, Jr., Morris Plains; Rafael J. Puente-Duany, Florham Park, both of N.J.

[73] Assignee: Exxon Research and Engineering Co., Florham Park, N.J.

[21] Appl. No.: 687,595

[22] Filed: Dec. 31, 1984

[51] Int. Cl.⁴ .............................. B03C 3/01
[52] U.S. Cl. .................................. 55/6; 55/10; 55/85; 55/131; 55/340; 208/127; 210/733
[58] Field of Search .................. 55/5, 6, 10, 85, 89, 55/131, 122, 99, 479, 340; 209/5; 48/197 R; 210/733; 208/127

[56] References Cited

U.S. PATENT DOCUMENTS

| | | | |
|---|---|---|---|
| 2,894,603 | 7/1959 | Vasan | 183/121 |
| 4,017,278 | 4/1977 | Reese | 55/96 |
| 4,035,170 | 7/1977 | Lear et al. | 55/479 |
| 4,123,235 | 10/1978 | Giesen et al. | 55/89 |
| 4,126,435 | 11/1978 | Reese | 55/474 |
| 4,169,714 | 10/1979 | Calvert | 55/6 |
| 4,256,468 | 3/1981 | Mazer et al. | 55/8 |
| 4,289,603 | 9/1981 | De George | 208/127 |
| 4,505,723 | 3/1985 | Zahedi et al. | 55/131 |

FOREIGN PATENT DOCUMENTS

| | | | |
|---|---|---|---|
| 2842718 | 4/1979 | Fed. Rep. of Germany | 55/131 |
| 99851 | 9/1976 | Japan | 55/89 |
| 2036604 | 7/1980 | United Kingdom . | |

Primary Examiner—Bernard Nozick
Attorney, Agent, or Firm—Marthe L. Gibbons

[57] ABSTRACT

An electrically resistive flocculating agent is added to electrically conductive solid fines recovered from an electrofiltration zone. The dry flocculated solid fines including the flocculating agent are recycled to the electrofiltration zone in which a gaseous mixture containing fines is contacted with an electrically enhanced mass of solid contact particles.

10 Claims, 1 Drawing Figure

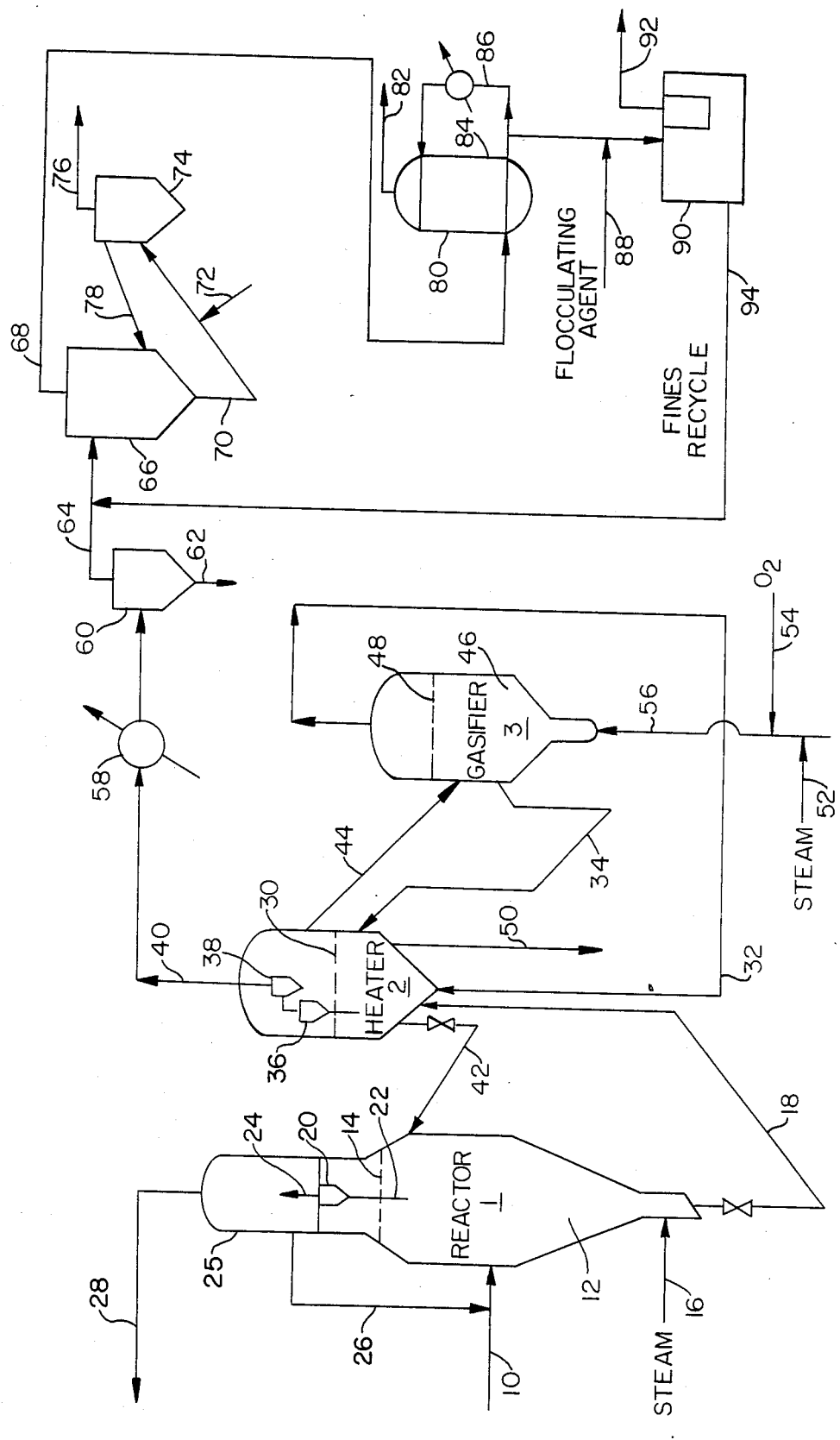

PROCESS FOR REMOVING SOLIDS FROM A GAS CONTAINING THE SAME

BACKGROUND OF THE INVENTION

1. Field of the Invention

This invention relates to an improvement in a process for the removal of solid fines from a gaseous mixture containing the same.

2. Description of Information Disclosures

It is known to remove solids present in a gaseous stream by contacting the gaseous stream with finely divided contact solids. Such gas-solids separation processes are sometimes referred to as granular bed filter processes, see, for example, Perry's *Chemical Engineers' Handbook*, 4th Edition, McGraw Hill at 20–74 and 20–75. Furthermore, the contact particles in the separation processes may be subjected to electrostatic forces to increase the efficiency of the separation. See, for example, U.S. Pat. Nos. 4,126,435 and 4,017,278, the teachings of which are hereby incorporated by reference and UK patent application GB No. 2,036,604A.

In the separation processes such as the electrofiltration processes described in the above mentioned patents, an electrically conductive member is disposed within a moving mass of substantially electrically resistive solid contact particles. A voltage is applied to the electrically conductive member during the contacting of the gas containing finely divided solids with the mass of solid contact particles. The electrically enhanced granular filtering stage is effective to remove the major portion (e.g. 99%) of fines from the gas being treated. A remaining portion of the fines (e.g. 1%) may still be in the gaseous effluent of the electrically enhanced granular filtration zone. When the fines that remain in the gaseous effluent are electrically conductive, for example, coke particles, the fines recovered from the gaseous effluent cannot be recycled to the electrically enhanced filtration zone since they would build up to a level so as to affect the operation of the process.

It has now been found that the electrical conductivity of coke fines can be decreased so that they may be recycled to the electrically enhanced granular filtration zone and that the granular filtration stage itself is also improved.

It is known that solids can be separated from a liquid medium by use of flocculating agents such as polymers. Flocculating agents are commercially available.

U.S. Pat. No. 4,256,468 discloses a method for removing particulates and condensable matter from a sinter plant gas. An anionic polymer flocculating agent is added to a water slurry and the flocculated solids are separated from the water.

U.S. Pat. No. 2,894,603 discloses treating a water and soot slurry with a flocculating agent and separating the soot from the water in a filter.

SUMMARY OF THE INVENTION

In accordance with the invention, there is provided a process for removing solids from a gaseous mixture comprising solid fines and $H_2O$, which comprises the steps of:

(a) contacting said gaseous mixture, in a first separation zone, with a moving mass of substantially electrically resistive solid particles which has disposed therein an electrically conductive member, to which a substantial voltage is applied to said member during said contacting, to remove at least a portion of said solid fines from said gaseous mixture;

(b) passing the gaseous effluent resulting from step (a) comprising water vapor and a decreased amount of said solid fines to a cooling zone to condense said water vapor from said gaseous effluent and to remove an additional amount of said solid fines from said gaseous effluent thereby producing water comprising said additionally removed solid fines, the improvement which comprises:

(c) adding a substantially electrically resistive flocculating agent to said water comprising said solid fines to produce flocculated solid fines;

(d) separating said flocculated solid fines from said water in a second separation zone, thereby producing wet flocculated solid fines associated with said flocculating agent;

(e) drying said wet flocculated solid fines to produce dry flocculated solid fines associated with said flocculating agent; and (f) recycling said dry flocculated solid fines associated with said substantially electrically resistive flocculating agent to said first separation zone of step (a).

BRIEF DESCRIPTION OF THE DRAWING

The FIGURE is a schematic flow plane of one embodiment of the invention.

DESCRIPTION OF THE PREFERRED EMBODIMENT

The process of the invention is suitable for removing solids from a wide variety of gaseous mixtures, for example, gaseous mixtures derived from the gasification of solid carbonaceous materials, such as coal or coke. The process is particularly suitable to treat gaseous mixtures produced by the gasification of fluid coke such as those shown in U.S. Pat. No. 3,661,543, the teachings of which are hereby incorporated by reference. The gaseous mixtures produced in the gasification of fluid coke when gasification is effected by either air or oxygen have typical compositions as shown in Table I:

TABLE I

| Constituent | Air Gasification mole % | Oxygen Gasification mole % |
|---|---|---|
| $H_2$ | 6.5 | 24.2 |
| $H_2O$ | 2.9 | 20.0 |
| CO | 19.9 | 34.2 |
| $CO_2$ | 7.9 | 19.8 |
| $N_2$ | 61.9 | 0.1 |
| $H_2S$ | 0.9 | 1.7 |
| COS | 0.02 | 0.02 |

The actual composition of the gaseous mixtures to be treated may vary widely and may comprise from about 0.5 to about 5 grains of solid fines (e.g. coke fines) per standard cubic foot of gas (gr/SCF). The process is particularly suited for treatment of recovered fines which have electrical conductivity which would normally prevent recycling of the fines to the electrically enhanced filtration process, such as coke fines which comprise metals (Ni, Fe, V) derived from the heavy hydrocarbonaceous oils from which the coke was produced.

The term "fines" is used herein to designate solid particles having diameters ranging up to about 74 microns in size.

The preferred embodiment will be described with reference to the accompanying FIGURE.

Referring to the FIGURE, a carbonaceous material having a Conradson carbon residue of about 15 weight percent, such as heavy residuum having a boiling point (at atmospheric pressure) of about 1050° F.+ is passed by line 10 into a coking zone 12 in which is contained a fluidized bed of solids (e.g., coke particles of 40 to 1000 microns in size) having an upper level indicated at 14. Carbonaceous feeds suitable for the coking zone include heavy hydrocarbonaceous oils; heavy and reduced petroleum crudes; petroleum atmospheric distillation bottoms; petroleum vacuum distillation bottoms; pitch, asphalt, bitumen, other heavy hydrocarbon residues; tarsand oil; shale oil; coal; coal slurry; liquid products derived from coal liquefaction processes and mixtures thereof. Typically, such feeds have a Conradson carbon residue of at least 5 weight percent, generally from about 5 to about 50 weight percent, preferably above about 7 weight percent (as to Conradson carbon residue, see ASTM Test D-189-65). A fluidizing gas, e.g., steam, is admitted at the base of coking reactor 1 through line 16 in an amount sufficient to obtain superficial fluidizing gas velocity in the range of about 0.5 to 5 feet per second. The fluidizing gas may comprise steam, vaporized normally liquid hydrocarbons, normally gaseous hydrocarbons, hydrogen, hydrogen sulfide and mixtures thereof. Typically, the fluidizing gas will comprise steam. Coke at a temperature above the coking temperature, for example, at a temperature from about 100° to about 1000° F. in excess of the actual operating temperature of the coking zone is admitted to coking reactor 1 by line 42 in an amount sufficient to maintain the coking temperature in the range of about 850° to about 1400° F., preferably from about 900° to 1200° F. The pressure in the coking zone is maintained in the range of about 0 to about 150 pounds per square inch gauge (psig), preferably in the range of about 5 to about 45 psig. The lower portion of the coking reactor serves as a stripping zone to remove occluded hydrocarbons from the coke. A stream of coke is withdrawn from the stripping zone by line 18 and circulated to heater 2. Conversion products are passed through cyclone 20 to remove entrained solids which are returned to the coking zone through dipleg 22. The vapors leave the cyclone through line 24 and pass into a scrubber 25 mounted on the coking reactor. If desired, a stream of heavy material condensed in the scrubber may be recycled to the coking reactor via line 26. The coker conversion products are removed from scrubber 25 via line 28 for fractionation in a conventional manner. In heater 2, stripped coke from coker reactor 1 (commonly called cold coke) is introduced by line 18 to a fluid bed of hot coke having an upper level indicated at 30. The bed is partially heated by passing a fuel gas into the heater by line 32. Supplementary heat is supplied to the heater by coke circulating in line 34. The gaseous effluent of the heater, including entrained solids, passes through a cyclone which may be a first cyclone 36 and a second cyclone 38 wherein separation of the larger entrained solids occurs. The separated larger solids are returned to the heater bed via the respective cyclone diplegs. The heated gaseous effluent which still contains entrained solid fines is removed from heater 2 via line 40. The fines removal system will be subsequently described herein.

Hot coke is removed from the fluidized bed in heater 2 and recycled to coking reactor by line 42 to supply heat thereto. Another portion of coke is removed from heater 2 and passed by line 44 to a gasification zone 46 in gasifier 3 in which is maintained a bed of fluidized coke having a level indicated at 48. If desired, a purge stream of coke may be removed from heater 2 by line 50.

The gasification zone is maintained at a temperature ranging from about 1600° to about 2000° F., and a pressure ranging from about 0 to about 150 psig, preferably at a pressure ranging from about 10 to about 60 psig, and more preferably at a pressure ranging from about 25 to about 45 psig. Steam by line 52 and an oxygen-containing gas, such as air, commercial oxygen or air enriched with oxygen by line 54 are passed via line 56 into gasifier 3. Reaction of the coke particles in the gasification zone with the steam and the oxygen-containing gas produces hydrogen and carbon monoxide-containing fuel gas. The gasifier product fuel gas, which may further contain entrained solids, is removed overhead from gasifier 3 by line 32 and introduced into heater 2 to provide a portion of the required heat as previously described.

Returning to line 40, the heater gaseous effluent containing entrained solids has the typical composition that was shown in Table I.

The gas of line 40 comprises coke fines in an amount ranging from about 0.5 to about 5.0 grains per standard cubic foot of gas. The heater gaseous effluent, including the entrained solids, is passed by line 40, if desired, to an indirect heat exchanger 58 and then optionally to a tertiary cyclone 60 in which a portion of the larger entrained solids is separated and removed from the cyclone as dry fines by line 62. When a tertiary cyclone is used, the size of the larger particles to be separated can be varied to suit the particle size requirements of the granular filter. Thus, in the process described in U.S. Pat. No. 4,017,278, the particles to be removed from the gas to be treated in the electrically enhanced filtration step are preferably less than 5 microns in diameter. A gaseous stream 64 comprising hydrogen, carbon monoxide and the smaller coke fines is removed from cyclone 60 and passed to a separation zone 66 (i.e. electrically enhanced granular filtration zone) which comprises a mass of contact particles that acts as a filter to which the coke fines adhere or in which the coke fines are trapped. The preferred separation process to remove the fines from stream 64 is an electrofiltration process such as the one described in U.S. Pat. Nos. 4,126,435 and 4,017,278, the teachings of which are hereby incorporated by reference, and British Pat. No. 2,036,604A. In such a process, the gaseous mixture comprising solid fines is contacted with a moving mass of substantially electrically resistive solid particles such as gravel which has disposed therein an electrically conductive member and wherein a voltage is applied to the member during the contacting step. As described in published British patent application GB No. 2,036,604A, the flow rate of the gaseous mixture through the moving mass in the electrofiltration process may range from 50 to 200 feet per minute. The velocity is not critical. The voltage applied to the electrically conductive member may range from 2,000 to 50,000 volts.

At least a portion of the contact particles comprising the separated coke fines are removed from separation zone 66 by line 70. The resulting gaseous stream having a decreased content of coke fines is removed from separation zone 66 by line 68.

The portion of contact particles comprising the separated coke fines is passed by line 70 to separation zone 74. A transport gas, which may be an inert gas or a process derived gas, is introduced into line 70 by line 72 to lift the solids into separation zone 74 wherein the coke fines are disengaged from the contact particles by being entrained overhead in the transport gas and from which zone the fines are removed by line 76. If desired at least a portion of the contact particles from which the fines have been removed are passed by line 78 to separation zone 66.

The gaseous stream removed by line 68 may still comprise from 0.01 to 1.0 grains of coke fines per dry standard cubic foot of gas (gr/SCF) and water vapor.

Gaseous stream 68 is passed into cooling zone 80 which may be a gas-liquid contacting zone in which the water vapor is condensed to liquid phase $H_2O$ (i.e. water) while at least a portion of the coke fines that were present in stream 68 is removed from the gas by being entrained into the water. The clean gas, that is, a gas from which the water vapor has been condensed (removed) and having less coke fines than stream 68 is removed from cooling tower 80 by line 82. A stream 84 comprising the water that was condensed in cooling tower 80 and coke fines, which may be present in an amount ranging from about 50 to 1000 wppm, is removed from cooling tower by line 84. A portion of this stream may be used as pumparound circuit as indicated at 86. At least a portion of stream 84 comprising water and coke fines is passed to a conventional filtration zone 90. A flocculating agent is added to coke fine-containing stream 84 by line 88 before this stream is introduced into filtration zone 90. The flocculating agent may be any substantially electrically resistive flocculating agent such as a water soluble polymers, preferably nonionic polymers. Any flocculating agent that would decrease the electrical conductivity of the coke fines may be used. The water stream which contains the coke fines and the flocculating agent is passed into filtration zone 90, wherein the coke fines become flocculated solids on the filter. The major portion of the water that was separated is removed as clean filtrate. The filter on which the flocculated coke fines are deposited is washed with water. The wet flocculated coke fines associated with the flocculating agent are removed from filtration zone 90 by line 94. The wet fines are dried by evaporation in line 64 by the process. The dry flocculated coke fines comprising the flocculating agent are introduced into line 64 for recycle into separation zone 66. This recycle is made possible because the flocculating agent decreased the electrical conductivity of the coke fines on gravel as shown in Table II.

TABLE II

| Amount of coke dust on gravel, | Voltage at which conductivity rapidly rises (breakdown voltage) | |
|---|---|---|
| | Coke dust without flocculant | Coke dust treated with flocculant[2] |
| 0.5 | 45 kV[1] | >80 kV |
| 2.0 | 30 kV | 75 kV |
| 5.0 | 15 kV | 30 kV |

[1]kV = thousand volt
[2]flocculant used was a nonionic polyacrylamide (Nalco 7871)

The resistivity of the gravel/coke fines mixture is shown in Table III.

TABLE III

| Applied Voltage | Resistivity of gravel/coke fines mixture in mega ohms-centimeters | |
|---|---|---|
| | 0.5 wt % coke with flocculant on gravel | 0.5 wt % coke without flocculant on gravel |
| 25 kV | >16,000 | 9,000 |
| 50 kV | 16,000 | 1,500 |
| 75 kV | 8,000 | <500 |

Furthermore, the electrical conductivity of the mass of moving solids in zone 66 is also decreased due to the presence of the electrically resistive flocculating agent. This permits use of a wider range of operating conditions in separation zone 66 (i.e. electrically enhanced granular filtration zone).

What is claimed is:

1. In a process for removing solids from a gaseous mixture comprising solid fines and $H_2O$, which comprises the steps of:
   (a) contacting said gaseous mixture, in a first separation zone, with a moving mass of substantially electrically resistive solid particles which has disposed therein an electrically conductive member, to which a substantial voltage is applied to said member during said contacting, to remove at least a portion of said solid fines from said gaseous mixture;
   (b) passing the gaseous effluent resulting from step (a) comprising water vapor and a decreased amount of said solid fines to a cooling zone to condense said water vapor from said gaseous effluent and to remove an additional amount of said solid fines from said gaseous effluent thereby producing water comprising said additionally removed solid fines, the improvement which comprises:
   (c) adding a substantially electrically resistive flocculating agent to said water comprising said solid fines to produce flocculated solid fines;
   (d) separating said flocculated solid fines from said water in a second separation zone thereby producing wet flocculated solid fines associated with said flocculating agent;
   (e) drying said wet flocculated solid fines to produce dry flocculated solid fines associated with said flocculating agent, and
   (f) recycling said dry flocculated solid fines associated with said substantially electrically resistive flocculating agent to said first separation zone of step (a).

2. The process of claim 1 wherein said solid fines are coke fines.

3. The process of claim 1 wherein said flocculating agent is a nonionic polymer.

4. The process of claim 1 wherein said gaseous mixture of step (a) comprises from 0.5 to 5 grains of solid fines per dry standard cubic foot of gas.

5. The process of claim 1 wherein said gaseous effluent resulting from step (a) comprising said decreased amount of solid fines comprises from about 0.01 to about 1.0 grains of solid fines per dry standard cubic foot of gas.

6. The process of claim 1 wherein said voltage ranges from about 2000 to about 50,000 volts.

7. The process of claim 1 wherein said flocculated solid fines are separated from said water in step (d) by filtration.

8. The process of claim 7 wherein said gaseous mixture of step (a) comprises larger solid fines and smaller solid fines and wherein at least a portion of said larger solid fines is removed from said gaseous mixture prior to contacting said gaseous mixture with said mass of solid particles.

9. The process of claim 1 wherein said solid fines removed from said gaseous effluent of step (b) are electrically conductive and wherein said flocculated solids resulting from step (c) have a decreased electrical conductivity.

10. The process of claim 9 wherein said electrically conductive solid fines are coke fines.

* * * * *